US011487722B2

(12) United States Patent
Mueller Graf et al.

(10) Patent No.: US 11,487,722 B2
(45) Date of Patent: Nov. 1, 2022

(54) SCALABLE QUERYING FOR DISTRIBUTED SYSTEMS

(71) Applicant: Adobe Inc., San Jose, CA (US)

(72) Inventors: Thomas Mueller Graf, Langenthal (CH); Stefan Egli, Basel (CH)

(73) Assignee: ADOBE INC., San Jose, CA (US)

( * ) Notice: Subject to any disclaimer, the term of this patent is extended or adjusted under 35 U.S.C. 154(b) by 227 days.

(21) Appl. No.: 16/787,902

(22) Filed: Feb. 11, 2020

(65) Prior Publication Data
US 2021/0248116 A1 Aug. 12, 2021

(51) Int. Cl.
G06F 16/00 (2019.01)
G06F 16/21 (2019.01)
G06F 16/215 (2019.01)
G06F 16/23 (2019.01)
G06F 16/22 (2019.01)

(52) U.S. Cl.
CPC .......... G06F 16/213 (2019.01); G06F 16/215 (2019.01); G06F 16/2255 (2019.01); G06F 16/2365 (2019.01)

(58) Field of Classification Search
CPC .. G06F 16/213; G06F 16/215; G06F 16/2255; G06F 16/2365
See application file for complete search history.

(56) References Cited

U.S. PATENT DOCUMENTS

| 7,933,208 | B2 * | 4/2011 | Bronnimann | H04L 63/145 |
| | | | | 713/154 |
| 8,964,234 | B1 * | 2/2015 | Robinson | G06F 3/1264 |
| | | | | 358/1.15 |
| 2019/0356563 | A1 * | 11/2019 | Nikolaidis | H04L 47/2441 |
| 2021/0136142 | A1 * | 5/2021 | Dong | G06F 9/5033 |

OTHER PUBLICATIONS

Dharmapurikar, Sarang, et al. "Deep packet inspection using parallel bloom filters." 11th Symposium on High Performance Interconnects, 2003. Proceedings.. IEEE, 2003.*

(Continued)

Primary Examiner — Nan Hutton
(74) Attorney, Agent, or Firm — F. Chau & Associates, LLC

(57) ABSTRACT

A flexible, scalable, and fast query system for a distributed execution environment is provided. An example method includes receiving a plurality of processor summaries, each including a list of job digests, each job digest including a job identifier for a job running on a job processor and a payload portion. The method can also include, for each job digest, determining a location in a probabilistic payload data structure for the job digest and storing the payload portion and a fingerprint portion generated from a portion of a hash of the job identifier in an entry at the location as a job summary and responding to queries using the probabilistic payload data structure. Responding to a particular query may include identifying job properties corresponding to parameters of the particular query, updating job property statistics, and using the job property statistics to change the job properties represented in the payload portion.

19 Claims, 4 Drawing Sheets

(56) References Cited

OTHER PUBLICATIONS

Jayapandian, N., and A. M. J. Zubair Rahman. "Secure and efficient online data storage and sharing over cloud environment using probabilistic with homomorphic encryption." Cluster Computing 20.2 (2017): 1561-1573.*

"GitHub—FastFilter/fastfilter_Java: Fast Approximate Membership Filters (Java)", retrieved from https://github.com/FastFilter/fastfilter_Java, downloaded on Dec. 20, 2019, 2 pages.

Mueller Graf, Thomas, et al., "Xor Filters: Faster and Smaller Than Bloom and Cuckoo Filters", arXiv:1912.08258v1, Dec. 17, 2019, 16 pages.

* cited by examiner

SCALABLE QUERYING FOR DISTRIBUTED SYSTEMS

TECHNICAL FIELD

This description relates to a query system for a distributed environment. More specifically, the description relates to a fast and flexible query system that returns responses to exact and approximate queries using a data structure that is normally used for approximate membership.

BACKGROUND

In a distributed processing environment, processes or programs need certain tasks to be performed. These tasks are also referred to as jobs. While the job creator may not actively wait on a job it requested, aspects about the job can be useful to the job creator. Aspects about the job and/or the job processors can also be useful to other job creators and/or other processes or subsystems, such as load balancers. For example, a load balancer may find it useful to know how many jobs of a certain type and/or state are running on each job processor. A job creator may find it useful to know the state of a particular job.

Distributed job processing systems can be implemented via a persistence-based implementation or a message-based implementation. A persistence-based implementation uses shared databases for both distribution and assignment of jobs and has native support for queries. Because of native support for queries, querying may be straightforward, but such a system requires many small, expensive transactions between the job processors and the distributor/query system to keep the data in the persistence layer accurate. Thus, persistence-based systems are expensive in terms of computer resources. As the size of a distributed system grows, allocation of the necessary resources in the persistence-based query system becomes prohibitive at scale. A message-based implementation supports distribution and load-balancing in a resource-friendly way and can easily scale, but messaging-based systems lack support for queries.

SUMMARY

Implementations provide a query system for a messaging-based distributed processing system. The query system relies on a novel data structure similar to those normally used for approximate membership. The novel data structure, referred to herein as a probabilistic payload structure, enables the system to respond to some approximate queries without having to contact any job processors and to respond to exact queries with minimal communications, e.g., at best one and at worst a handful of requests sent to job processors. Some implementations operate using an in-memory storage area storing flexible and dynamic job summaries. Some implementations may use mixed memory, e.g., some in-memory and some disk data storage. The job summaries are flexible because they have no fixed schema, unlike some persistence-based query systems. Because the schema is not fixed, the fields in the job summary can change based on the needs of the distributed system. An example system may monitor statistics about which job properties are requested by queries and how different resources, such as messages sent, time spent sending and waiting for responses, etc. are expended in responding to queries. An example system may change the schema of a job summary to minimize messaging and/or improve query response time. Implementations use a data structure similar to those used for approximate membership but with the addition of payload data for each entry for the job summary. The use of this data structure, the probabilistic payload structure, enables an example system to have a small memory footprint while minimizing resources expended to obtain the information needed to reply to a query. The small memory footprint and minimization of computing resources expended for messaging enables example systems to achieve fast query response times and to scale to very large distributed systems.

The details of one or more implementations are set forth in the accompanying drawings and the description below. Other features will be apparent from the description and drawings, and from the claims.

DETAILED DESCRIPTION

Figure 1:
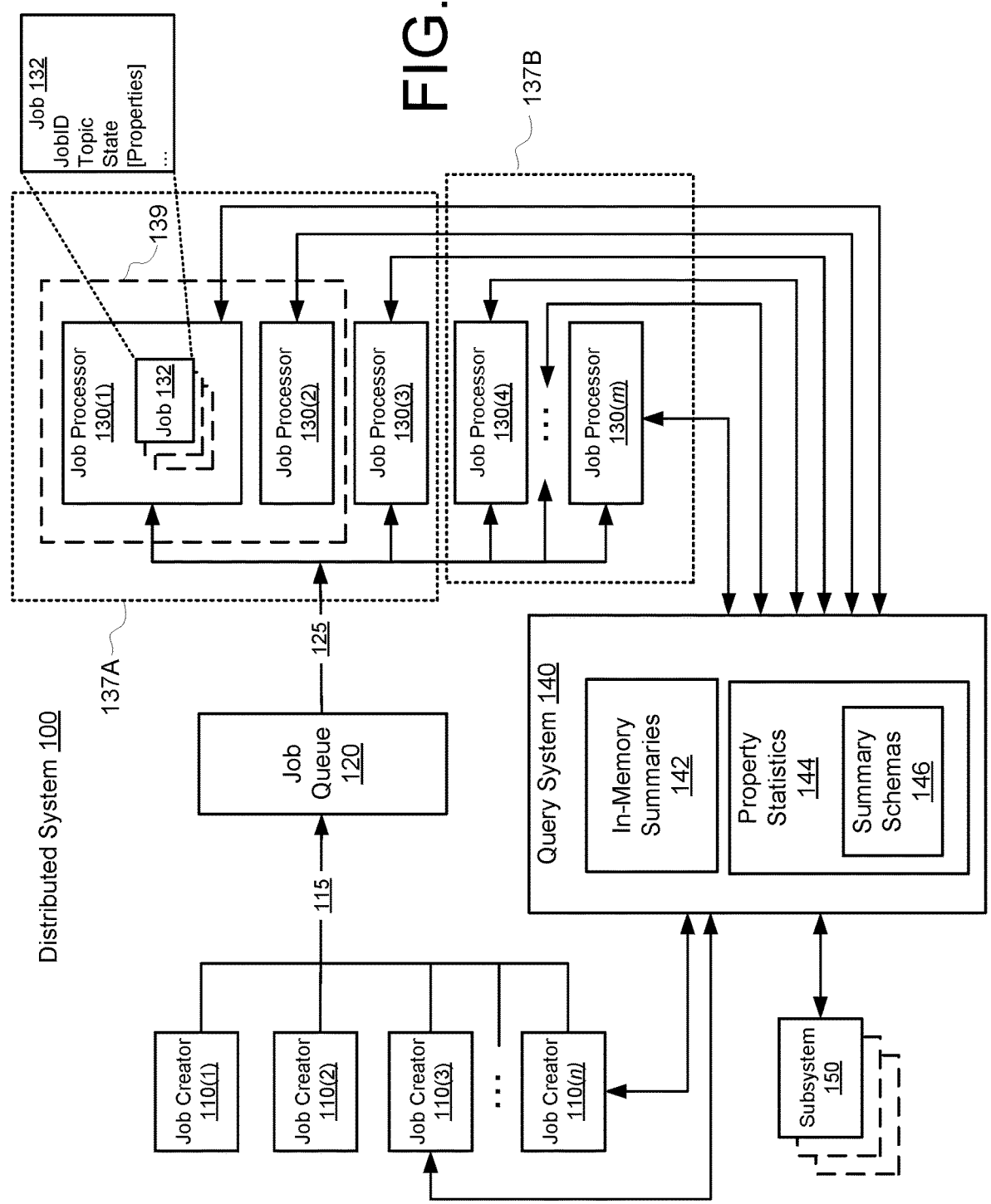
FIG. 1 is a block diagram of a distributed job processing environment that utilizes a probabilistic payload data structure in the query system, according to an implementation.

Implementations provide a fast, flexible, and scalable query system for a message-based distributed computing environment. The query system uses a probabilistic payload data structure to respond to approximate and exact queries and to reduce the messaging performed to answer queries. In most cases, implementations can provide an answer to an approximate and to an exact query in one roundtrip. Sometimes, multiple roundtrips are needed, depending on the configuration of the data structure. In an example system, each job processor in the distributed environment sends a processor summary to the query system on a periodic basis. The processor summary includes information about the job processor and may include summary statistics for the job processor. The processor summary also includes a list of added, updated, and removed job digests. The list of job digests includes at least one row for each job that the job processor is executing. Each row includes a key portion and a payload portion. If an entry was updated, two rows may be included for a job, one that contains the old information, and one that contains the new information. The old information may be used to ensure the correct entry is updated in the probabilistic payload data structure. The key portion includes the key field. The payload portion includes additional bits that represent job property values often needed (in a condition or as a result) by queries. In some cases, the payload portion may include most or all job properties for a job. In some implementations, the payload portion may include a job processor identifier.

Implementations put the job digests into a probabilistic payload structure as job summaries and use the probabilistic payload structure to answer some queries and to filter the candidate job processors for the remaining queries, so that messaging is minimized. For example, when a query contains a key property condition (the property used in the key portion of the job digest), the query system may identify a position or positions within the probabilistic payload structure where a matching job summary might be located. When a query lacks the key property, the query system may inspect all entries in the probabilistic payload structure. In either case, the query system may use the fingerprint portion or the payload portion of entries in the probabilistic payload data structure, or in other words job summaries from the list of job summaries, to identify a particular job processor (or processors) to message. Some queries will require a message sent to the job processor(s) associated with the identified row(s). Some approximate queries can be answered using the identified entries in the job summary without messaging a job processor. The query system can track statistics for various job properties, e.g., keeping track of the number of times a property is used as a condition or in a result in a query and/or the time or number of messages needed to get a response. The query system may use this information to optimize the size of the fingerprint portion, the size of the payload portion, and/or the contents of the payload portion, e.g., increasing the size of the fingerprint portion stored, changing the job properties stored in the payload portion, etc.

As used herein, a job is a task or series of tasks that are executed as a unit by a job processor. A job can also be referred to as a transaction and can perform any task or series of tasks. Some jobs run quickly, e.g., within a few seconds. For example, a job (transaction) that executes a trade or represents a purchase, may take only a few seconds. Some jobs are much longer, e.g., executing for several minutes or even hours. For example, a job streaming a video may take minutes or hours. As used herein, a job processor is either a physical computer or a logical partition of a physical computer that executes jobs. In some implementations, a job processor can also be referred to as a node. Job processors can be grouped together in a logical group referred to as a cluster. In some implementations, job processors may have a peer. A peer is a different job processor that is paired with the job processor and may receive information from the job processor that enables the peer to report a processor summary on behalf of the job processor.

An approximate membership data structure is a probabilistic payload data structure that provides a definitive negative answer and a probabilistic positive answer to a query. Examples of such data structures are Bloom filters, cuckoo filters, and quotient filters. Some approximate membership data structures are fingerprint-based, in that they store a part of the hash of the key (called the fingerprint) in the data structure entry. Examples of fingerprint-based approximate membership data structures are cuckoo filters, quotient filters, Morton filters, and Golomb-compressed sequences. In the context of the present disclosure, a probabilistic payload data structure is a fingerprint-based data structure that supports storing payload data. The probabilistic payload data structure is used for both approximate membership (by using the fingerprint portion), and to store payload data, e.g., additional properties of jobs. The probabilistic payload data structure can definitively determine that a particular job is not found in the list of job summaries (by failing to find a matching entry for the fingerprint), but may return one or more entries for a particular query. For example, if the query condition is a job identifier, the probabilistic payload data structure can return one or more rows, also referred to as candidates. A match of even one row can represent a false positive (unless it is known that the given row exists for that key value), and more than one row represents at least one false positive. But the number of false positives (candidates) is generally small (e.g., less than five, although this is dependent on implementation details and system configuration).

The probabilistic payload data structure enables implementations to filter down the number candidate job processors, or in other words job processors that are likely to have the requested information and are messaged for the information. Without such filtering, all job processors would need to be sent the query. As used herein, the content of the probabilistic payload data structure may also be referred to as a list of job summaries, where each entry in the probabilistic payload data structure represents one job summary. In some implementations, a location in the probabilistic payload data structure may store multiple entries. Each job processor may send a list of job digests to a query system as part of a processor summary and the query system may populate the probabilistic payload data structure from these received lists.

As used herein, a processor summary includes information that identifies the job processor, information on how to contact the job processor, and a list of job digests for jobs assigned to a particular job processor. A job digest is similar to a job summary with at least one difference. A job digest has a key portion that includes a value for the key field (e.g., "12334"). A job summary has a fingerprint portion that includes a fingerprint of a hash of the value for the key field (e.g., 0b0100110). In some implementations the payload portion of a job summary is the same as the payload portion of a job digest. In some implementations, a job processor identifier may be added to the payload portion of a job summary, as described below.

A query system may use the information on how to contact the job processor to send a message to the job processor. In some implementations, each job digest includes in the payload portion the information that identifies the job processor. In some implementations, the query system may add information that identifies the job processor to the payload portion of the corresponding job summary based on information received in the processor summary. In some implementations, the information may not necessarily uniquely identify the job processor. In such an implementation, when there is a collision on the information (e.g., two job processors are potentially identified by the information in the payload portion) the query system may message both job processors. In some implementations, the job processor information is not included in the payload portion of the probabilistic payload data structure entries (job summaries). In such an implementation, the query system, if a message needs to be sent to generate the response, the query system may message all job processors.

Messages are exchanged between the query system and the job processors. For example, a query system may send a request for particular job properties to be included in the payload portion of a job digest, a request to increase or decrease bits used to store one or more of the job properties in the payload portion, or a query request that seeks certain information from the job processor. The information may include whether the job processor is running a particular job and/or values for job properties for a particular job or jobs with specified job property values (selection criteria).

In some implementations, a processor summary may also include statistics for the job processor. The statistics can include the number of jobs the processor is executing. The statistics can include the number of jobs in a certain state, or in each state for jobs assigned to the job processor. The statistics can include the number of jobs by job topic. The statistics can include throughput for the job processor. Other similar statistics can be included based on implementation requirements. An aggregate value (e.g., count, sum, etc.) for a particular job property is referred to as a property summary in the processor summary. In other words, a property summary is some aggregate value (i.e., some quantity) for each property value of a job property. In some implementations, the query system may request that one or more of these statistics and/or property summaries be included in the processor summary. In some implementations, the job processor may inform the query system that a statistic or property summary was included in the processor summary. Property summaries may or may not be stored in main memory (i.e., in in-memory storage).

As used herein a job digest is an entry in the processor summary. The job digest has two portions, the key portion, which stores the value for a key field. A key field can be any field or field combination that uniquely identifies the payload portion of the job digest. For example, the key field can be a job identifier. Before storing the entry in the approximate payload data structure, the key portion is hashed, then truncated to become the fingerprint portion of a job summary. The size (number of bits) of the fingerprint portion in the entry of the probabilistic payload data structure (the job summary) is dynamically configurable. The hash of the key from the key portion of a job digest is used to determine one or more locations in the probabilistic payload data structure where the job summary can be stored. In some implementations, the probabilistic payload data structure may use a second hash for a second position where the job summary can be stored, etc. This same hash (or two hashes) can be used to later locate the positions where the job summary may be stored. Position location and collision handling work as with other fingerprint-based data structures that support storing payload data.

Once a position (also referred to as a location) in the probabilistic payload data structure is located, the query system stores the payload portion from the job digest and the fingerprint portion as an entry in the probabilistic payload data structure. In some implementations the query system may add a processor identifier to the payload portion before storing the job summary. Put another way, a job summary stored at a location in the probabilistic payload data structure is referred to as an entry in the data structure. In some implementations, the position may allow storing of two, three, or more entries, i.e., job summaries, at the location. In some implementations, the position may only allow one entry to be stored per location.

Each job summary includes a fingerprint portion, which is a part of the hash that was used to locate the position in the data structure. The size of the fingerprint portion represents a tradeoff between memory usage and accuracy (the expected false positive probability). The more bits used to store the fingerprint portion, the more likely a query for a particular key value will return a single entry from all the job summaries for that key value. On the other hand, reducing the number of bits in the fingerprint portion enables the query system to store more entries in the finite, in-memory data store, but this also increases the probability of finding two or more entries with matching fingerprint portions.

In some implementations, the number of bits used in (size of) the fingerprint portion is configurable depending on usage of the finite, in-memory data store. For example, if the in-memory data store has room, i.e., memory usage is not high, some implementations may increase the number of bits stored in the fingerprint portion. In other words, the size of the portion of the fingerprint can increase. Similarly, if memory usage is high, the size of the fingerprint portion may decrease. In some implementations, the fingerprint portion may have a minimum size, so that the fingerprint portion is never smaller than the minimum number of bits. In some implementations, the minimum size may be set by a client entity, i.e., an entity paying for or otherwise controlling the submission of jobs.

A job summary also includes a payload portion. The payload portion includes data for one or more properties about the job. Properties can be any field that describes some aspect of a job. Non-limiting examples of job properties include a state of the job, the job processor, a type of the job, a creation time and/or date for the job, a location for the job, an execution time for the job, progress information, etc., or any other information somehow related to the job. The value of a job property in the job summary may be accurate or approximate. For example, a time-based job property may be expressed as a full time (accurate), or as a number of minutes or hours (approximate). In some implementations, client entities may control the properties available for jobs under their control. The payload portion is adaptive. This means that the properties represented in the payload portion can change, depending on memory usage (e.g., of the usage in an in-memory portion of the data store), on received query requests, or on other factors monitored by the query system. The payload portion can be different for each job processor and/or between job summaries for the same processor. For example, longer running jobs may include more job properties in the payload portion than shorter running jobs. The properties represented in the payload portion may change based on query statistics and memory usage. In addition to which properties are represented in the payload portion, the number of bits allotted to each property, i.e., the number of bits holding a value for the property, may vary. The payload portion stores a respective value for each of the properties represented in the payload portion. Thus, the payload portion may be said to comprise property values. The property values can be stored as transformed values. For example, property values can be hashed, mapped, encoded, compressed, or truncated. The transformation can include storing a partial hash, similar to the fingerprint. How the property values are stored in the payload portion may change based on query statistics and memory usage, client entity requirements, etc., as disclosed herein.

As used herein, an in-memory summary schema describes the content of an entry of the approximate payload data structure. For example, a summary schema may indicate the size of the fingerprint portion. A summary schema may indicate the job properties included in the payload portion. A summary schema may indicate the number of bits allocated to each job property in the payload portion.

In some implementations, a summary schema may indicate which job properties are included in the payload portion. These job properties may be in addition to the key property, which is used to generate the fingerprint portion. The summary schema may indicate how many bits the property value occupies in the payload portion. The summary schema may indicate where in the payload portion a job property value is located. Information such as this enables the query system to determine how to access a property value. This also enables the query system to adapt the payload portion to make the best use of the fixed in-memory storage. In some implementations, each job processor may have a different schema. In some implementations, certain jobs within a job processor may have respective schemas (e.g., a schema record identified by certain properties). In some implementations, jobs for certain client entities may have a respective schema. In some implementations, the query system may notify a job processor of the desired schema for its list of job digests. In some implementations, a job processor can provide the schema in its processor summary that was used for the list of job digests and/or for a particular job digest.

As used herein, a job property statistic is a measure related to the job property that is tracked by the query system. The measure can be the number of times the job property has been included in a query. The measure can be the number of times a message was sent to a job processor to obtain or verify a value of the job property. The measure can be the amount of time that elapsed obtaining an exact value for the property. The measure can be a likelihood of the property value actually having been requested.

Details of the systems and techniques are discussed below with respect to the illustrated figures. FIG. 1 is a block diagram of a distributed job processing environment that utilizes an approximate membership data structure query system, according to an implementation. The distributed system 100 includes a plurality of job creators 110, e.g., job creator 110(1) to job creator 110(n). The job creators may be a physical computing device such as a server, a personal computing device, a mainframe, etc., with at least one processor formed in a substrate and various memories. The memories store computer instructions in the form of programs, applications, modules, etc., and store data. In some implementations, the job creators 110 may be logical partitions of a computing device, such as a virtual machine. In some implementations, one or more of the job creators 110 may be a program or application running on a physical computing device or a logical partition of a physical computing device. In some implementations, two or more job creators 110 may be running on the same physical computing device. Any of the job creators 110 may be in communication with another job creator and/or other computing devices. The job creators 110 each are operable to request execution of one or more jobs. In some implementations, the job creators 110 may place a job request 115 in a job queue 120. Although illustrated in FIG. 1 as a single queue, job queue 120 may represent multiple job queues. The job queue 120 is a logical structure that organizes job requests 115 from different job creators 110 for execution by one of the job processors 130. The job queue 120 may be a simple first-in-first-out queue or may include logic that orders job requests by priority or some other criteria.

The distributed system 100 may include a plurality of job processors 130, e.g., job processor 130(1) to job processor 130(m). Each of the job processors 130 may be a physical computing device or a logical partition of a physical computing device. In some implementations, the job processors 130 may be organized in a cluster. The cluster may be configured for load balancing. Load balancing aims to ensure that each job processor in the cluster is executing a similar workload. This prevents any one job processor from becoming too busy, e.g., maximizing existing computing resources such as memory and/or processing power. Load balancing may be accomplished using any known or later discovered techniques. In some implementations, the job processors 130 may be organized into two, three, or more clusters, e.g., cluster 137A and 137B of FIG. 1. In some implementations, clusters can logically overlap. In other words, one or more of the job processors 130 may be in more than one cluster. Each of the job processors 130 is configured to execute one or more jobs 132. Each of the job processors 130 may select or may be sent 125 one of the jobs in the job queue 120. Because of the use of the job queue 120, the job creators 110 do not know which job processor 130 will be/is assigned a respective job requested by the job creator. In addition, in some implementations, a job that starts execution on one job processor may be moved, e.g., by a load balancer, to another job processor, due to load balancing or the job processor crashing. Thus, in some implementations, job creators 110 are unable to directly query a job processor for state information related to a requested job.

In some implementations, each job processor may be assigned 1 or more peers. In the example of FIG. 1 job processor 130(1) and job processor 130(2) are in peer group 139. A peer can report a processor summary on behalf of its assigned peer at least once. For example, job processor 130(1) and job processor 130(2) may be communicatively coupled using known or later developed techniques to accomplish reporting on behalf of a peer.

The distributed system 100 may include query system 140. The query system 140 may be a physical computing device, a logical partition of a physical computing device, or a program or application running on a computing system. The query system may communicate with the job creators 110 and the job processors 130. Although illustrated in FIG. 1 as a single query system 140, the query system 140 may represent multiple copies of a query system. For example, in some implementations the system 100 may include a farm of query systems 140. In some implementations a query system may be co-located with the job creator 110. In some implementations a query system 140 may be co-located with a job processor 130. Accordingly, in some implementations, the query system 140 may represent many copies of query system 140 e.g., to load-balance queries and/or for other purposes such as, but not limited to, co-location with job creators or job producers.

In some implementations, the query system 140 may communicate with other subsystems 150. Subsystems 150 may represent any computing device or computer program/ application configured to send queries to the query system 140. In some implementations, the subsystems 150 may represent only such computing devices or computer programs/applications that are authorized to use (e.g., authenticated to) the query system 140. Examples of such subsystems 150 are load balancers, monitoring and alerting systems or other administrative systems, etc. In some implementations, the job processors 130 may also use the query system 140. For example, if a first job processor dies, a second job processor may be assigned to finish executing a job that had been running on the first job processor. The second job processor can send a query to the query system asking for the job state of that job. A response may help the second job processor determine whether to retry the job or not. A retry would not be necessary if the job state indicates the job had not yet started running and a retry would be appropriate if the state indicates the job had been running.

Each job 132 may have different properties maintained by the job processor to which it is assigned. In some implementations, one or more of the properties may have their origin with the job creator. In some implementations, one or more of the properties may have their origin with the job processor. One property of a job 132 is the job identifier (jobId). This identifier uniquely identifies a particular job. If a job is moved from one job processor to another, the job maintains this identifier. The identifier can be assigned by the job creator. In some implementations, if not assigned by the job creator (e.g., if assigned by the queue 120, a job processor, or a load balancer), the job identifier may be communicated back to the job creator. Each job 132 may have additional properties. Examples of such properties include a job topic, a job state, a location for the job, a beginning timestamp for the job, or any other data item relating to the job that the job processors 130 are configured to maintain or that the job creator provides to facilitate the job processor's work. In some implementations, a client entity may set or control the job properties for jobs they control.

Each job processor is configured to generate a processor summary on a periodic basis. The period can be set to ensure that the query system 140 receives updates often enough to generate an accurate response to a query. This period may be very short, e.g., every few seconds, or may be longer, e.g., once a minute, every few minutes, but can be longer, e.g., every 10 minutes in implementations where jobs run longer. The job processors can opt to send summaries additionally as they see need, e.g. for long-running jobs. The processor summary includes information used for contacting the job processor, e.g., an IP address, a URL, an API call, or some such similar information. The processor summary includes an identifier for the job processor sending the processor summary. In some implementations, the identifier may be included once, e.g., with the information used for contacting the job processor. In some implementations, the identifier may be included in the payload portion of the job digests. Thus, the query system 140 need not know in advance about every job processor. The processor summary may also include a time stamp, which enables the query system 140 to delete processor summaries that are not replaced and are too old.

The processor summary may also include one or more property summaries and/or other statistical information. A property summary represents some aggregate value (e.g., a count, or a sum) calculated over the jobs assigned to the job processor with a particular job property value. For example, the processor summary may include a state property summary that lists, for each state, the number of jobs assigned to the job processor that have the state value. As another example, the processor summary may include a topic property summary listing the number of jobs assigned to the job processor for each topic value. The processor summary may also include the number of jobs assigned to the job processor, the total CPU or memory resources consumed by jobs assigned to the job processor or some such similar statistics.

The processor summary also includes a list of job digests. Each job digest corresponds to a job assigned to the job processor. Each job digest has a key property. The key property is the job property that uniquely identifies the job, such as the job identifier.

Each job digest also includes a payload portion. The payload portion may include one or more job property values for the job. The job properties in a payload portion can be set according to a schema. The schema may be sent from the query system 140. The schema may include job properties to be included in the payload portion. The schema may include the number of bits the property value should occupy in the payload portion. The number of bits occupied by the property value may be fewer than the bits represented by the full value of the property. For example, if a job has a city property the schema may indicate that only the first letter, first two letters, or first three letters of the city are to be stored in the payload portion. In other words, the city may be truncated. As another example, the schema may indicate that only the first 12 bits or first 20 bits of a hash of the city are stored in the payload portion. In some implementations, the size of a property in the payload portion, or in other words the number of bits allocated to a particular job property in the payload portion, may be at least a minimum number of bits. In some implementations, the size of a property in the payload portion may not be more than a maximum number of bits, or in other words a maximum size. Put another way, the schemas are not fixed and can be dynamically adjusted by the query system, the job processors, or both.

In some implementations, the job processor can override a schema for one or more of the jobs assigned to the job processor. For example, for a long running job the job processor may include all or almost all properties for the job. The property values for the job may be transformed, e.g., encoded, hashed, or truncated, as disclosed herein. The job processor may provide the query system with information that indicates which job digests do not conform to the requested schema. This information can indicate that a particular job digest includes all properties. The information can indicate which job properties differ from a default schema. The information can indicate which job properties are included and how many bits each property value takes up in the payload portion of the job digest. In some implementations, the job processor may change a requested schema. For example, a job processor may add properties to the job digest. As another example, a job processor may increase or decrease the size of the property value, e.g., expressed in bits allocated to the property. As another example, the job processor may remove a property.

A job processor may set a schema for all job digests generated by the job processor. In such a scenario, the job processor may send a message to the query system indicating the changes to the schema. In another such scenario, the job processor may send a new schema to the query system that replaces a prior version of the schema for the job processor. Once the job processor has generated the processor summary, the job processor sends the processor summary to the query system.

Each of the job processors 130 is configured to receive requests from the query system 140. The request may be a query received by the query system 140. The query may request job properties for jobs that satisfy some criteria. For example, the query may request certain job properties for a requested job, i.e., for a requested job identifier. The query may be a confirmation that the job is assigned to the job processor. The query may be a request for one or more property values for the job. The query may be conditional, e.g., a request for one or more property values if some condition is met. The condition can be based on a value for one or more job properties. The job processors 130 are configured to send the requested information back to the query system 140 or to send an indication that the job is not assigned to the processor or that the job processor has no jobs that meet the requested conditions. The query parameters include conditional parameters (e.g., those job properties and values used in the condition specified in the query) and result parameters (e.g., job properties for which a value is requested for jobs matching the condition). In some implementations, the request from the query system 140 may be a command. For example, the query system 140 may be a command to stop a particular job.

The query system 140 includes in-memory summaries 142. The in-memory summaries 142 represent a probabilistic payload data structure with entries that store lists of job summaries from the job digests in the processor summaries received at the query system 140 from the job processors 130. Each entry in the probabilistic payload data structure represents a job summary from the received processor summaries. Each entry includes a fingerprint portion and a payload portion. The fingerprint portion may represent a portion of the hash of the key property in a job digest as received from the job processor. For example, the fingerprint portion may be a few (e.g., 12, 16, 20) bits of the hash of a jobId. The size of the fingerprint portion may change based on conditions at the query system 140. The payload portion of a job summary is the payload portion of a job digest as received from the job processor. In some implementations, the payload portion of a job summary has an identifier for the job processor added to it.

In some implementations, each of the processor summaries are stored in an in-memory data store on the query system 140. In some implementations, a portion of the processor summaries may be stored in a disk data storage and a portion, including the job summaries, may be stored in an in-memory data store. An in-memory data store represents data stored in a very fast-access memory, also referred to as main memory. Main memory is fast to access but expensive to acquire and use. Main memory differs from slower-access but less expensive, memory such as hard disk, tape, solid-state drive, or other non-volatile memory such as 3D XPoint. Because of the expense of main memory, the query system 140 optimizes the use of main memory for the summaries 142 to reduce the memory footprint. In some implementations, the amount of main memory allocated to the in-memory summaries 142 is fixed. In other words, the size of the in-memory summaries 142 may be limited by physical memory constraints. As processor summaries are received the query system 140, query system 140 updates the probabilistic payload data structure. For example, the query system 140 uses the key property of the job digest to determine a location (or two) within the probabilistic payload data structure where the job summary might be placed. The job summary (the fingerprint portion and the payload portion) are paced at the location (or one of the locations, as is known). If an entry with the same fingerprint from the same processor exists at the location, the query system 140 may replace the prior entry with the updated entry. In some implementations, an update to an existing entry may be sent in the form of a delete-add pair, where a previous job digest for a job enables the query system to locate and delete an entry and a new job digest for the job is then inserted. Put another way, when query system 140 receives a new processor summary for job processor 130(1), the new processor summary can replace entries previously inserted into the probabilistic payload data structure and/or add new entries, and remove entries.

In some implementations, one or more job property values may be stored independently of the job summary. For example, for long running jobs certain properties that do not change often may be stored in a separate structure outside of the job summaries. Such additional properties may be stored in any kind of memory. Such additional properties can also be used for responding to queries. In addition, property summaries from the processor summary may be stored independently of the job summaries.

The query system 140 also includes job property statistics 144. The job property statistics 144 may be stored in one or more memories. The memories may be of any suitable type of computer memory, including main memory, flash, cache, disc, etc. The job property statistics 144 represent information gathered and maintained by the query system 140 about different job properties. This query system 140 may use this information to dynamically (e.g., automatically and in real-time) adjust the content of the processor summaries (including in-memory summaries 142), as explained in more detail in the context of FIG. 4 below. For example, the query system 140 may track the number of times a job property is requested by a query. The tracking may occur for a predetermined window, e.g., the last hour, last five hours, last two days, etc. The query system may use the job property statistics 144 to, for example, add a job property to the payload portion (of a job digest/job summary), remove a job property from the payload portion, and/or swap one job property for another job property in the payload portion. The query system can use the job property statistics 144 to increase or decrease the memory allocated to (i.e., the size of) a property value in the payload portion. In some implementations, the system may prevent the size of a property value from falling below some minimum size unless the job property is removed from the payload portion. Key properties cannot be removed from the schema.

Changes to the job summaries may be recorded in the summary schemas 146. The summary schemas 146 may be stored in one or more memories. The memories may be any suitable type of computer memory. The summary schemas 146 specify which job properties are in the payload portion of a job summary/job digest. The summary schemas 146 specify the size of a property value in the payload portion. In some implementations, each job processor can have a different schema from other job processors. In some implementations, the summary schemas 146 may have a default summary schema. The default summary schema may apply to any job digest not changed by a job processor. In some implementations, the summary schemas 146 may have a default summary schema for each job processor. In some implementations, the summary schemas 146 may have a default summary schema for each client entity. A default summary schema may apply to any job processor/client entity unless the job processor indicates that a particular job digest differs from the schema. In some implementations, a job processor may provide a default schema to the query system.

The query system 140 uses the summary schemas 146 and the in-memory summaries 142 to respond to queries. The query requestor may be one of the job creators 110 or one of subsystems 150. The query may reference one or more job properties. For example, the query may request one or more job properties for a requested job identifier. As another example, the query may request all jobs assigned to a particular job processor or to the job processors for a particular cluster. As another example, a query may request the start time for all jobs associated with a certain location. In another example, the query may request the state of all jobs of a certain type. The query may request the state of any jobs associated with the city of Chicago, Ill. These examples are not exhaustive. The query may request the approximate number of jobs running in a certain state, or the approximate number of jobs associated with the city of Chicago. If a query does not indicate whether an approximate value is accepted, the query is assumed to be an exact query.

The query system 140 may generate a response for a query based on job summaries identified from the in-memory summaries 142, as explained in more detail below with regard to FIGS. 2 and 3. The query system 140 may also update job property statistics 144 as part of, or subsequent to, generating a result for a query. The query system may use the job property statistics 144 to dynamically adjust the payload portion of a job summary/job digest or the fingerprint portion of a job summary.

In some implementations, components of the distributed system 100 may be in communication with one or more other computing devices over a network. For example, the subsystems 150 may execute on a computer system remote from, but accessible to distributed system 100. Similarly, job creators 110 and/or job processors 130 may be remote from, but accessible to distributed system 100. The configuration of distributed system 100 is one example configuration and implementations include other configurations that operate using communications over one or more networks.

Figure 2:
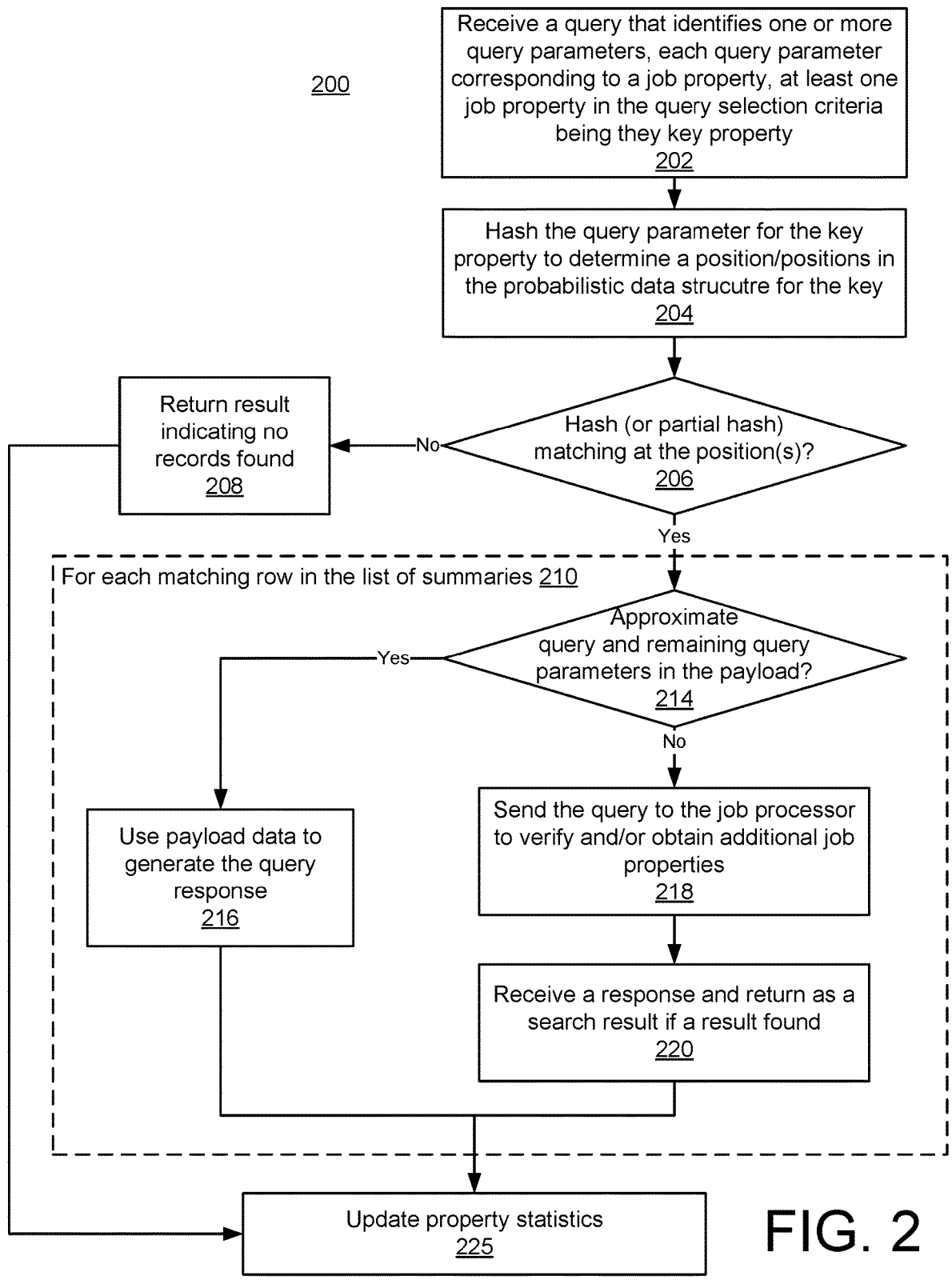
FIG. 2 is a flowchart illustrating an example query process that uses a probabilistic payload data structure to respond to a query with the key property, according to an implementation.

FIG. 2 is a flowchart illustrating an example query process that uses an approximate membership data structure to respond to a query with the key property, according to an implementation. The process 200 may be performed by a message-based query system, such as query system 140 of FIG. 1. The query may be sent from a requesting process, e.g., running on job creators, other subsystems, job processors, etc. Process 200 uses the approximate membership data structure to generate a query response with minimal messaging between the query system and the job processors. Process 200 is triggered by receipt of a query (202). The query includes one or more parameters. Each parameter corresponds to a job property and requested value for that property. Some of the parameters may represent selection criteria. Some parameters may be requested to be included in the response. Process 200 is triggered when at least one of the job properties in the selection criteria of a query is the key property, or in other words, the property used to generate the fingerprint portion. The job identifier is one example of a key property.

The system may apply a transformation to the requested value of the query parameter that corresponds to the key property (204). For example, if the key property is the job identifier, the system may generate a hash from the job identifier. The system may use the hash of the key value to identify locations within the list of job summaries where a matching entry might occur (206). The list of job summaries are all the job summaries received from the plurality of job processors. Because the list of job summaries resides in an in-memory data store, this lookup is fast and does not use many computing resources. The system may use a portion of the hash as a fingerprint with which to find matching entries at the identified locations. Put another way, the fingerprint portions of entries found at the location (or locations) identified can be compared with the fingerprint generated from the query parameter.

If no matching job summary entries are located (206, No), the system returns an indication that no records were identified (208). Because key properties are searched and nothing is found, the system can be certain that no records match the requested parameters. In some implementations, the system may update property statistics (225), e.g., with an indication of which job properties were requested in the query. For this query, process 200 ends.

If there is at least one matching job summary located (206, Yes), the system processes each matching job summary (210). Thus, steps 214 to 220 are described for one job summary, but these steps are understood to be performed for each matching job summary. If the query is an approximate query and any remaining query parameters are present in the payload portion of the job summary (214, Yes), the system can generate the query response from the payload portion (216) and does not need to contact any job processors. In some implementations, query may include an indication that the query is an approximate query and a query without this indication may be assumed to be an exact query. In some implementations, a query may include an indication that the query is an exact query and a query lacking this indication may be assumed to be an approximate query. The system may use the summary schemas to determine whether the remaining job properties requested in the query can be identified in the payload portion of the job summary. The schemas identify which job properties are represented in the payload portion. The query system can determine where in the payload portion a value for the job property is located. Using this information, the query system can determine whether the job summary is responsive to the query and generate the query response accordingly.

As part of generating the query response, the query system may determine whether the value from the payload portion satisfies a selection criteria. For example, some of the query parameters may represent selection criteria; e.g., that a job property has a matching value or falls within some range. If the property value in the matching job summary does not satisfy the criteria, the job summary is not included in the query response. If the job summary does not satisfy the criteria and this job summary was the only matching job summary, then the query response generated at 216 is an indication that no records were found. If all query requirements (criteria) are met, then the query system may use the payload portion to generate the requested response. A next matching job summary may be processed (e.g., at 214).

If the query is an exact query or if there is a job property that is not included in the payload portion of the matching job summary (214, No), the query system sends the query to the job processor associated with the matching job summary (218). The query is sent so that the job processor can provide a response from the information the job processor has. The message sent may also function as a verification request. A verification request is used to verify that a matching value in the job summary is not a false positive. The response may be an indication that the job processor has no matching information. The response may be the information requested by the query. The query system receives the response (220) and uses the response to generate the search result. In some implementations, the generation of the search result is based on what is returned. In addition, the search result provided to the query requester may be a combination of the results from the different job processors, e.g., if more than one job summary is processed as part of step 210. In some implementations where only one matching row exists (e.g., 210 is performed for a single job summary), even if the query is an exact query the system may not message the job processor if the remaining query parameters are in the payload portion of the job summary. This may occur when it is known ahead of time that the sought for entry does exist. In such a scenario the system may use the payload data to generate the response.

In some implementations, the query system can split a response, e.g., generating a first response that excludes values for certain requested properties and generating a second response that can includes the previously excluded values at a later point in time. This can allow the query system to respond quicker without having the full result, thus allowing the query requestor to get a partial response quicker. For example, a client may request the status and a message property for a group of jobs. The client may need the group of jobs, together with the status of each job, to be shown in a UI immediately, but may not need the message property immediately. In such a scenario the query system may provide a response with a job status for each job in the requested group of jobs from the probabilistic payload data structure first and then work to obtain the message property for each job and send that response later. The query requestor may be able to proceed based on the partial response, in which case the query request is not blocked. Put another way, the query system may be able to provide the later (second) response before the query requestor has noticed the absence of the excluded values. If the query system is temporarily blocked by the lack of certain values, the temporary blockage is no longer than the requestor would have waited for the full response sent in a single communication. Thus, implementations that are configured to split a response enable the query system to respond more quickly to some queries than it otherwise would.

Even if only one matching job summary is identified (e.g., in step 206) in some implementations the system still sends the query to the associated job processor. This ensures that a false positive is not included in the search result, e.g., the match of the partial hash is not in fact a match of the full hashed property value. Thus, generating a result based on the identified job summary can still include providing a response that indicates no matches are found.

The query system may update property statistics using data obtained from the query and/or generation of the query result (225). For example, the query system may update a count that tracks the number of times a job property has appeared in a query. As another example, the query system may update a data item that tracks the number of times a message was sent to a job processor to verify one of the properties or that tracks the average number of messages sent to a processor for a particular job property. As another example, the query system may update a data item tracking the time elapsed in obtaining a result for one or more of the query fields. As another example, the query system may update a count of the queries requesting the number of jobs with a particular job property. Such a count may be used to request that the job processors add a property summary to the processor summary. As another example, the query system may update a count for job properties requested for particular job types. This enables the system to add those job properties to the payload portion for jobs of that type. Further customizations of the schema can be based on similar combinations of job properties. Process 200 then ends.

One advantage of process 200 is that rather than forwarding the query to every job processor in the distributed system, which is inefficient and slow, process 200 identifies job processors most likely to have the requested information and only sends messages to those job processors. In other words, the job summaries enable the query system to determine with reasonable certainty which job processors have the requested information and limits message sending to those candidate job processors, while at the same time keeping a very small memory footprint. This vastly reduces use of computing resources as compared with sending messages to all job processors or maintaining a full persistence layer, which requires several small transactions to keep the persistence layer accurate and represents a considerable performance limitation. In addition, the job summaries described herein can eliminate communications with job processors all together for some approximate queries. The adaptability of the information in the payload portion increases the likelihood of being able to respond to an approximate query without any messaging to a job processor.

Figure 3:
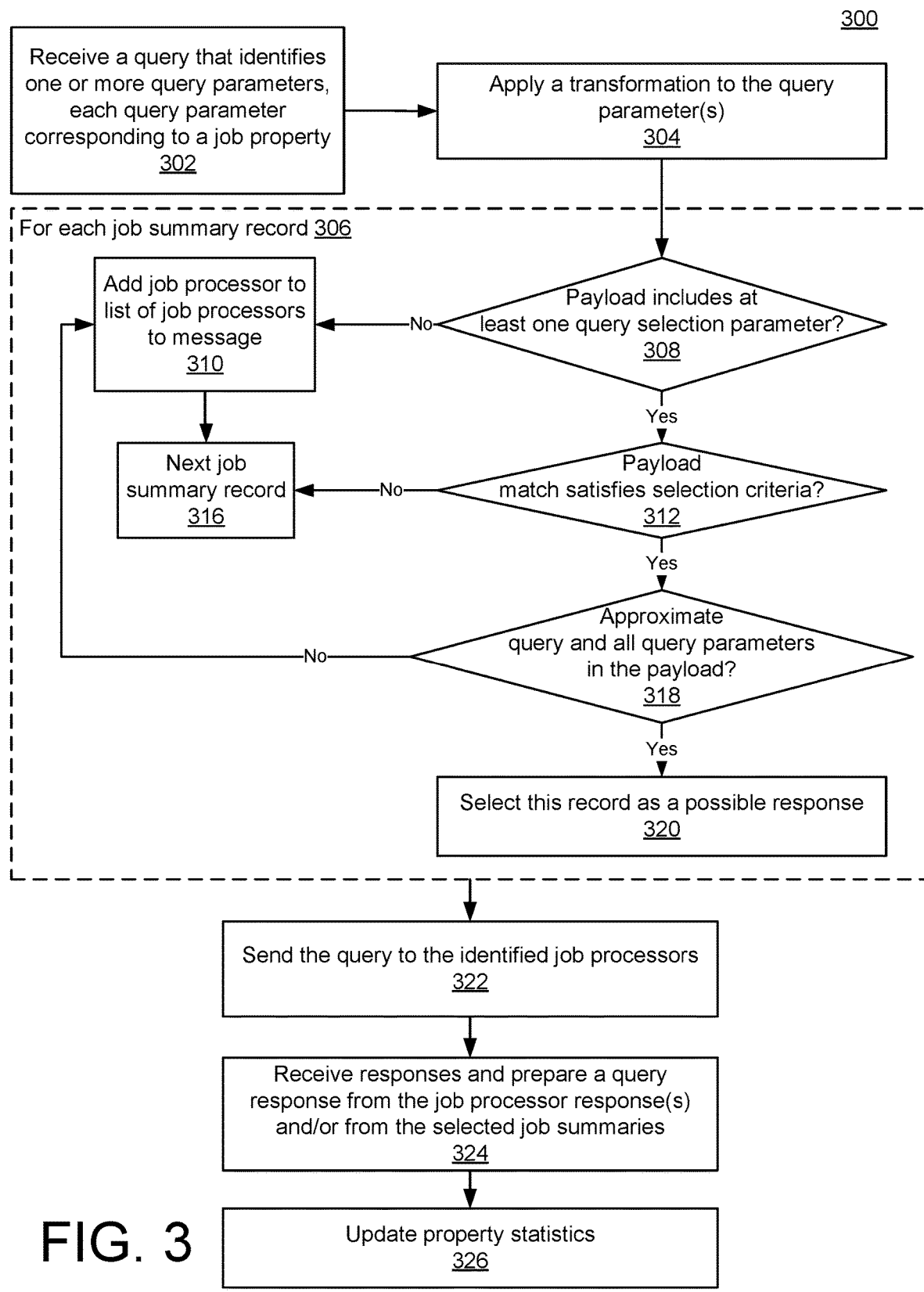
FIG. 3 is a flowchart illustrating another example query process that uses a probabilistic payload data structure to respond to a query, according to an implementation.

FIG. 3 is a flowchart illustrating another example query process 300 that uses an approximate membership data structure to respond to a query, according to an implementation. The process 300 may be performed by a message-based query system, such as query system 140 of FIG. 1. Process 300 is triggered when none of the job properties requested in the selection criteria is the key property. In this case, not every job summary may have a value for a job property in the job summary. For example, a query that requests the topic of all jobs originating from Chicago does not contain the key property in the selection criteria.

Process 300 begins with receipt of the query that identifies one or more job properties in the query parameters (302). One of more of the query parameters may correspond to selection criteria. The system may apply a transformation to the value of the query parameter that corresponds to the property (304). One type of transformation is a hash algorithm applied to the query parameter. The transformation may include selecting a portion of the result of the hash. The transformation may be a mapping, e.g., mapping a state of "Active" to a value of 1, a state of "Suspended" to a value of 2, etc. Another transformation is truncation, e.g., truncating a location of Chicago to just "Ch" or "Chi", etc. The transformation may be a combination of these, e.g., hashing the truncated string. Other transformations are possible. In some implementations, the transformation results in fewer bits representing the property value. Applying the transformation is optional, depending on the job property requested. Whether a transformation is applied and what kind of transformation is applied may be determined from the summary schema. In some implementations whether a transformation is applied is hard coded for a property and not based on a schema.

The query system may search each entry in the list of job summaries and perform analysis of each job summary (each entry) to determine which job processors may include jobs possibly responsive to the query (306), or in other words to identify the candidate job processors. As with FIG. 2, the list of job summaries analyzed includes all job summaries received from the job processors, or in other words all job summaries stored in the in-memory data store. Because the list of job summaries resides in an in-memory data store, this lookup is fast. For each job summary, the system determines whether the payload portion of this job summary includes at least one job property that corresponds to a query parameter in the selection criteria (308). Whether a job property is represented in the payload portion may be determined from the schemas (e.g., a default schema and/or a schema from the job processor that generated the job summary). If none of the job properties corresponding to the selection criteria are represented in the payload portion of this job summary (308, No), then the job processor associated with the job summary must be messaged to accurately respond to the query. Accordingly, the job processor associated with the job summary is flagged as a candidate processor (310) and a next job summary is fetched (316) and step 306 repeats with the next summary.

If at least one job property corresponding to the query selection criteria is represented in the payload portion of the job summary (308, Yes), then the system determines whether that job property value in the payload portion satisfies the selection criteria (312). If it does not, a next job summary record is fetched (316) as the job summary can be safely eliminated from consideration. This, of course, is subject to Boolean logic in the selection criteria. For example, if the selection criteria includes two job properties joined with an "OR" and only one of the properties appears in the payload portion, failure to match that property criterion is not dispositive of the selection criteria (e.g., the other criterion is unknown and could result in a match). However, if the two job properties are joined with an "AND" and the job property in the payload does not satisfy its criterion, this is dispositive and the selection criteria is not met. If the payload portion satisfies the selection criteria (312, Yes), the system determines whether the query is an approximate query and whether any remaining query parameters are present in the job summary (318). If so (318, Yes), the system can select the job summary as a job summary responsive to the query (320). As a job summary responsive to an approximate query, the system may be able to generate a response without having to message the job processor. Although not illustrated in FIG. 3, a next job summary record is fetched and analyzed, e.g., as in step 316. If the query is an exact query or if there is at least one job property needed for the query that is not in the payload portion (318, No), the system flags the job processor associated with the job summary as a candidate processor (310) and a next job summary is fetched (316).

Once all job summary records have been analyzed, the query system can send the query to the candidate job processors (322). The candidate job processors are those identified as likely having responsive information based on the job summaries, e.g., in step 310. The query can serve as a verification request, e.g., verifying that a matching value does indeed match and is not a false positive. If no job processors were identified during analysis of the job summaries, steps 322 and 324 are optional. The system generates a response to the query (324) based on responses from the candidate job processors and/or any job summaries flagged as responsive to the query (e.g., in step 320). The responses from one or more of the candidate job processors may indicate no matching records are found. It is also possible that all candidate job processors indicate no matching records are found. In such a scenario, a response that no information was found is still a response generated based on the job summaries. The query system may update property statistics using data obtained from the query and/or generation of the query result (326), as discussed above with regard to FIG. 2. Process 300 then ends.

Although not specifically discussed with regard to FIG. 3, process 300 may also include the ability of the query system to split a response, e.g., generating a first response that excludes values for certain requested properties and generating a second response that can includes the previously excluded values at a later point in time. Accordingly, the query processors of FIGS. 2 and 3 do not represent the exclusive ways of handling queries. Implementations may also use any property summaries included in the processor summaries where appropriate. For example, the query system may respond to a query that requests the number of jobs with an active state by using a property summary for the state. Thus, implementations are not limited to the exact uses of the processor summaries explicitly set forth in FIGS. 2 and 3.

Figure 4:
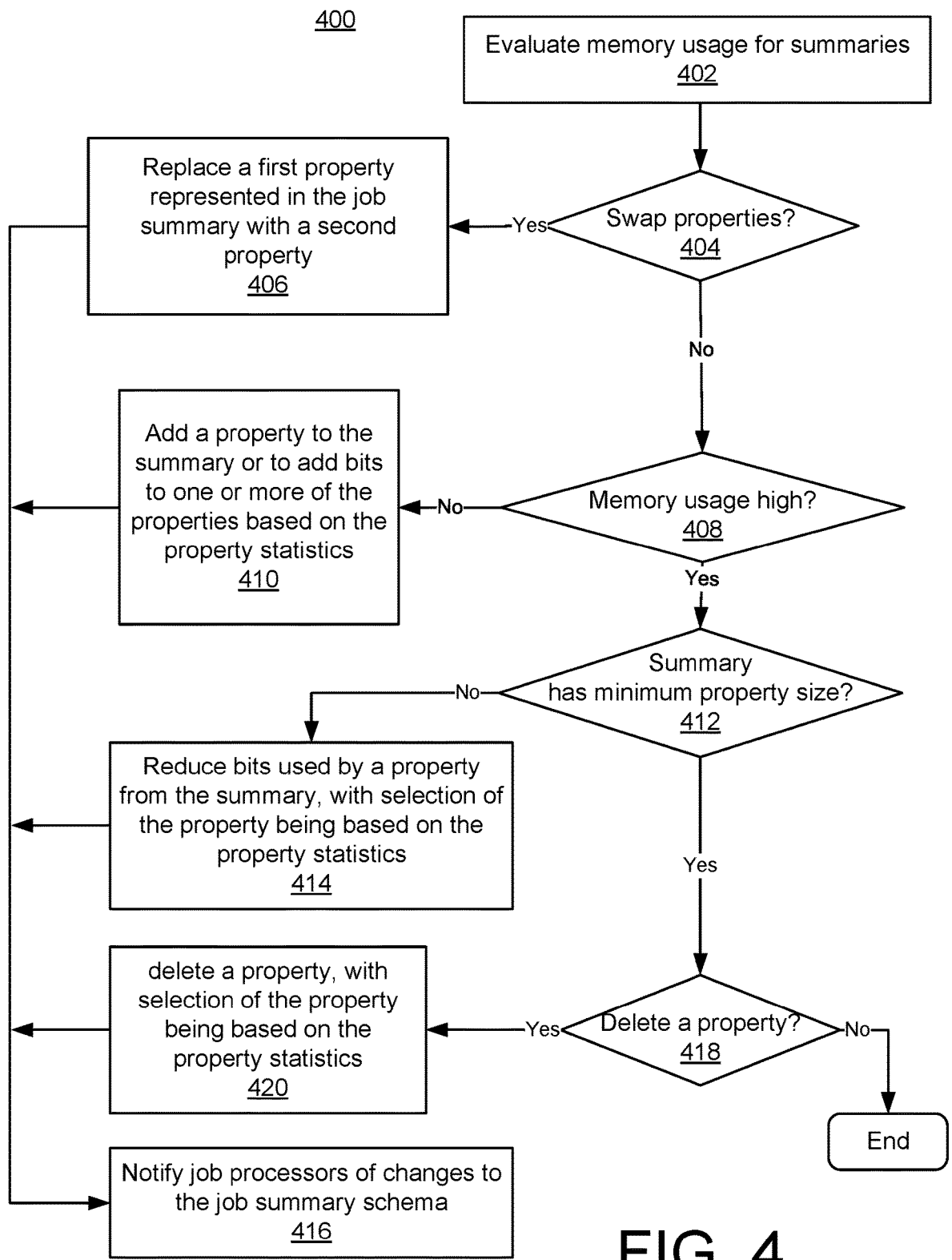
FIG. 4 is a flowchart illustrating an example process for changing the schema of a summary, according to an implementation.

FIG. 4 is a flowchart illustrating an example process 400 for changing the schema of a summary, according to an implementation. Process 400 can be performed at a query system that uses a dynamically adaptable approximate membership data structure, such as query system 140 of FIG. 1. With some modifications, process 400 could also be performed at one or more job processors, such as job processors 130 of FIG. 1. Process 400 may be run periodically by the system, e.g., at some scheduled interval. Process 400 may be triggered by a condition occurring, e.g., memory allocation/usage in the in-memory data store running too low or too high based on predetermined thresholds.

Process 400 enables a system to dynamically change the job properties in a payload portion of the job digest, and thus the job summary, and/or the size of the fingerprint portion of a job summary to minimize the messaging to job processors in responding to queries. The job summaries reside in a fixed, in-memory storage area, so the amount of memory available for the processor summaries is limited. However, the number of jobs running in the distributed environment can be volatile. In other words, the number of jobs assigned to processors, and therefore the size of the processor summaries, can fluctuate over time. This means that the memory usage, or in other words the number of bits/bytes storing data as opposed to empty bits/bytes, in the in-memory data store can fluctuate over time. When there are more jobs running, process 400 enables the query system to pare down the job summary content so that more job summaries can fit in the in-memory data store. Likewise, when fewer jobs are running, process 400 enables the query system to increase what is stored in the job summaries, making it more likely that a query response can be generated without messaging job processors. In addition, process 400 enables the system to grow and shrink the job summaries intelligently. For example, an implementation may begin with only the job identifier in the fingerprint portion and the state in the payload portion and may add other job properties to the payload portion based on observations about the types of information requested most often in queries.

Process 400 begins with evaluation of the memory usage in the in-memory data store (402). For example, the system may determine whether the memory usage is high, e.g., the data usage in the in-memory data store exceeds some predetermined threshold. The system may also determine whether the memory usage is low, e.g., the data usage falls below some predetermined threshold. The system may also evaluate the property statistics. For example, the system may determine which job properties are most often requested, which ones are least often requested, and how many times messages needed to be sent to job processors to resolve a query. This statistic can signal that the portion of the fingerprint portion of the job summary may need to be increased, e.g., because there are too many false positives that result in the need for verification.

One determination the system may make is to determine whether to swap one job property for another job property in the payload portion (404). The determination may be based on the job statistics. For example, if the payload portion of the job summaries includes a job property that is not requested often by queries and there is another job property that is requested more often, the system may decide to swap the job properties (404, Yes). When job properties are swapped, the system removes a job property from the schema and replaces it with another job property (406). Details about how the value of the job property is stored in the payload portion (e.g., a transformation to apply, the number of bits used, and/or where in the payload the value appears) can also be included to the schema. This change to the payload portion can be made in a default schema. The change to the payload portion can be made in a schema for a particular job processor. While FIG. 4 illustrates a single swap, implementations may be configured to swap multiple job properties where appropriate. Any changes made are reported to the affected job processors (416).

In addition to or instead of swapping properties the system may perform additional analysis. For example, the system may evaluate memory usage in the in-memory data store (408). If memory usage is not high (408, No), the system may add one or more job properties to the payload portion or add bits to a property value (410). For example, the system may increase the size of the portion of the job identifier hash stored in the fingerprint portion. As another example, the system may add a job property to a default schema. The determination of which job property to add to the payload portion may be based on the property statistics. For example, a job property most often requested as part of a query may be selected for addition. In some implementations, job properties that have been used by a threshold number of queries may be added to the schema. Depending on how light memory usage is, more than one job property can be selected and/or a size of a job property value in the payload portion may be increased. When a job property is added, a transformation can be selected for the job property, e.g., applying a hash and then selecting a portion of the hash for storage in the job summary. As another example, truncation of all but a few bits of the job property value may be selected. As another example, mapping the value to an efficient code. Other transformations or combinations of transformations may be used. The transformation to be applied can be part of the schema.

If memory usage in the in-memory data store is high (408, Yes), the system may determine whether to decrease the number of bits used by the value of a job property or properties (412). In some implementations, a particular job property value may have a minimum size, or in other words cannot be smaller than a minimum number of bits. This may be to ensure that there are not too many collisions if a portion of a hash of the job property value is stored in the job summary, for example. As long as a job property is bigger than the minimum (412, No), the system can reduce the number of bits used by the job property from the payload portion (414). For example, if the job identifier previously used 20 bits in the fingerprint portion the system may reduce the number of bits to 16 or 12. Because the job summaries are lightweight in general, this reduction can greatly increase the number of job summaries that will fit in the in-memory storage area. Reducing the number of bits may result in more false positives, but enables the system to store more information. Any changes may be communicated to the job processors (416).

In addition to or instead, a job property can be removed from the payload portion (418). Such a change may occur if that job property is no longer being requested by queries or is not requested with sufficient frequency. If a job property is to be deleted (418, Yes), it is removed from the schema (420) and any changes reported to the job processors (416).

One way of notifying the job processors of changes to the summary schema (416) is to send a message to the job processors that contains a new default schema. Another way is to send a message to the job processors requesting the job processors make certain changes (e.g., add a new property, reduce the size of a property, swap two properties, delete a property) to the schema. In some implementations, the job processor can determine whether to follow the requested schema or to change it, e.g., generating its own schema. Any such changes a job processor makes to the default schema or a requested schema may be sent to the query system so the query system can properly interpret the payload portion of the job digests from that job processor. In some implementations, the changes may be made for a specific job processor or job processors. For example, a job processor that previously sent a larger schema may be requested to send a changed schema.

While illustrated in FIG. 4 as a particular workflow, the determinations made by implementations can be in any order and in any combination. For example, the system may swap properties regardless of memory usage when a first job property not in the payload portion is requested more frequently than a second job property that is in the payload portion, regardless of whether memory usage is high. As another example, the system may swap properties and increase the size of a third property value in the payload portion. As another example, the system may swap properties and decrease the size of a third property value in the payload portion. As another example, the system may remove a property from the payload portion and increase the size of a job property in the payload portion. In other words, any combination of optimizations may be made to the schema to ensure that best use is made of the in-memory storage area.

The process 400 may be used by the query system for "lazy loading." In lazy loading, the payload portion may initially include one property, e.g., job status. All other job properties may be added to the payload portion based on query statistics, e.g., frequency of request. In this manner, a system can automatically determine which properties provide the best performance for the query system.

For illustration, an example job summary and different queries that the job summary is responsive to is presented. In the illustrative example, a job processor may be assigned jobId 123456 with job properties of status with a value of 1 and color with a value of 15. The job processor may generate a job digest of 32 bits, with 26 bits for the jobId, 2 bits for the status, and 4 bits for color: e.g., {key: 0b11110001001000000, status: 0b01, color: 0b1111}. 32 bits is one example and the number of bits can be any number. In some implementations, the job processor may also add a data item representing an identifier for the job processor, e.g., a hash of the processor identifier, a code for the job processor, a partial identifier for the job processor, etc. Thus, for example the job processor could store 6 bits for the processor identifier: e.g., {key: 0b111110001001000000, status: 0b01, color: 0b1111, processorId: 0b100011}. In some implementations, the processor identifier may be added by the query system.

To store a job summary in the probabilistic payload data structure, the query system first determines where to store the entry based on the key, e.g., the jobId. In this example there may be two possible places, calculated from the hash of the key using two independent hash functions. For the purposes of illustration, the locations may be location 13 and location 20. In this example, location 13 has a free slot, so the query system stores the job summary at location 13. What is stored is the payload portion and a portion of the hash of the key, which is the fingerprint portion of the job summary. The fingerprint may be, in this example 10 bits. This 10 bits can be calculated from the hash of the key, using yet another hash function or may be a truncation of the hash of the key. In this example, the query system stores {fingerprint: 0b1011001001, status: 0b01, color: 0b1111} as a record in the probabilistic data structure. In some implementations, the query system may add an identifier for the job processor to the payload portion. For example, if the job processor has not added the processor identifier to the payload portion the query system may add the processor identifier. In some implementations a job summary lacks a processor identifier.

The query processor may receive a query such as "select * from jobs where jobId=123456". This query has a conditional parameter of jobId and result parameters of all other job properties available for the job. The query system may calculate the hash of the key and then calculate the locations 13 and 20 (e.g., using the two independent hash functions). The query system checks those locations in the probabilistic payload data structure and may find the following:

Location 13: {fingerprint: 0b1011001001, status: 0b01, color: 0b1111}.

Location 20: {fingerprint: 0b0010110010, status: 0b11, color: 0b1011}.

The query system then compares the fingerprint of the job id with the fingerprint portion of the records in location 13 and location 20. As the fingerprint portion in location 13 matches the calculated fingerprint of the job id provided as a query parameter, this entry represents a potential result. From that the query system can decode the status and color. If it is known ahead of time that a record for jobId 123456 does indeed exist, and the only job properties are status and color, then no messaging is needed to the job processor. If this is not known ahead of time a verification request may be sent to the job processor to verify that the entry does indeed correspond with jobId 123456.

As another example, the query system may receive a second query of "select * from jobs where color=15". From that query, the query system can iterate over all entries in the probabilistic payload data structure, and return those that have color=0b1111, regardless of the fingerprint portion.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable-storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific-integrated circuit). Method steps may also be performed in a different order than illustrated in the figures.

Processors suitable for the execution of a computer program include, by way of example, both general and special purpose microprocessors, and any one or more processors of any kind of digital computer. Generally, a processor will receive instructions and data from a read-only memory or a random-access-memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

According to one general aspect a computer-implemented method includes receiving, from a requesting process, a query having a conditional parameter corresponding to a job property, hashing the conditional parameter to generate a hash, and selecting a portion of the hash. The method also includes identifying, from an in-memory storage area storing a list of job summaries at least one job summary with a property value that matches the portion of the hash. Each job summary is an entry in a probabilistic payload data structure. The method also includes generating a response to the query based on the at least one job summary. When the query is an exact query, generating the response includes sending a verification request to a job processor associated with the at least one job summary.

These and other aspects can include one or more of the following, alone or in combination. For example, the method may also include receiving a new processor summary from the job processor and, for at least one job digest in the new processor summary, identifying a location in the probabilistic payload data structure based on a hash of a key property in the job digest, matching a fingerprint portion at the location with a partial hash of the key property, and deleting a matching record or replacing a matching record in the in-memory storage area. As another example, the job property may be a key property and identifying the at least one job summary may include determining a location in the probabilistic payload data structure based on a hash of the conditional parameter and matching a portion of the hash to fingerprint portions of entries at the location. As another example, the conditional parameter may be a first parameter and the query has a second parameter corresponding to a second job property, and the method further includes, for each job summary of the at least one job summary, determining whether a payload portion of the job summary includes a value for the second job property and responsive to the payload portion including the value: applying a transformation to the second parameter, determining whether the payload portion has a value that matches the transformation, responsive to determining that the payload portion of the job summary has a value that matches the transformation, sending the verification request, and responsive to determining that the payload portion of the job summary lacks a second value that matches the transformation, excluding the job summary from the response to the query. In some implementations, determining whether the payload portion of the job summary can include a value for the second job property includes determining whether a summary schema includes the second job property for the job processor associated with the job summary.

As another example, the method may also include updating job property statistics to reflect that the query included the job property. As another example, the method may also include determining that a first job property is used in queries more frequently than a second job property and, responsive to determining that the second job property is included in job digests for the job processor and that the first job property is not included in job digests for the job processor, sending a request to the job processor to replace the second job property with the first job property in job digests generated by the job processor. In some implementations, the request may be sent to a plurality of job processors, the job processor being one of the plurality of job processors. As another example, the method may also include determining that a first job property is used in queries more frequently than a second job property and, responsive to determining that the second job property is included in job digests for a first job processor, determining that the first job property is not included in the job digests for the first job processor and determining that usage of the in-memory storage area is low, sending a request to the first job processor to add the first job property to job digests generated by the first job processor. As another example, the method may also include, responsive to determining that usage of the in-memory storage area is low and that the portion of the hash is smaller than a maximum size, increasing the number of bits represented by the portion of the hash in a summary schema. As another example, the method may also include, responsive to determining that usage of the in-memory storage area is high and that the portion of the hash is larger than a minimum size, reducing the number of bits represented by the portion in a summary schema. As another example, the method may also include determining that a first job property is used in queries more frequently than a second job property and, responsive to determining that the second job property and the second job property are included in job digests for the job processor and that memory usage for the in-memory storage area is high, sending a request to the job processor to delete the second job property from the job digest.

As another example, a plurality of property summaries may be stored, each property summary of the plurality of property summaries including a property value and a number representing a quantity of jobs with that property value running on a particular job processor. In such an implementation, the method may also include identifying property summaries with a property value that matches the portion of the hash and generating a response to the query based on the identified property summaries. As another example, generating the response to the query based on the at least one job summary can include generating the response from a payload portion of the at least one job summary responsive to determining that the query is an exact query, determining that a single job summary is identified, the at least one job summary being the single job summary, and determining that any remaining conditional parameters and result parameters are included in the payload portion.

According to one general aspect a method includes receiving, from each of a plurality of job processors, a processor summary. A processor summary for a job processor includes a list of job digests, each job digest in the list of job digests including a job identifier for a job running on the job processor and a payload portion. The payload portion includes at least one transformed job property value. The method can also include, for each job digest, determining a location in a probabilistic payload data structure for the job digest and storing the payload portion and a fingerprint portion generated from a portion of a hash of the job identifier in an entry at the location as a job summary and responding to queries using the probabilistic payload data structure. Responding to a particular query may include identifying job properties corresponding to parameters of the particular query, for each job property identified, updating job property statistics tracking the number of times the job property appears as a query parameter and updating statistics tracking resources used in accessing a value for the job property; and using the job property statistics to change the job properties represented in the payload portion for a job processor or to change the number of bits in the portion of the hash used to generate the fingerprint portion.

These and other aspects can include one or more of the following features, alone or in combination. For example, using the job property statistics to change the job properties in the payload portion can include determining that a first job property is used in queries at least a threshold number of times and sending a request to the plurality of job processors to include the first job property in the payload portion. In some implementations, the request to include the first job property is sent responsive to determining that usage of memory in the probabilistic payload data structure is low and/or is sent responsive to determining that a size of the payload portion is smaller than a maximum size.

According to one general aspect, a query system includes an in-memory list of job summaries by job processor, a memory storing job property statistics, at least one processor; and memory storing instructions that cause the query system to perform operations. Each entry in the list of job summaries can include a partial hash of a job identifier for a job and a payload portion for the job, the payload portion changing based at least on one job property statistic. The job property statistics may be updated based on received queries. The operations performed by the query system may include periodically receiving job digests from a job processor of a plurality of job processors, wherein new job digests for the job processor update the list of job summaries, receiving a query and responding to the query using the in-memory list of job summaries, updating the job property statistics with information obtained in responding to the query, and sending a message to the job processor requesting a new job property in the payload portion based on the updated job property statistics.

These and other aspect can include one or more of the following features, alone or in combination. For example, responding to the query using the in-memory list of job summaries can include identifying at least one job property in the query, generating a hash of the job property, and determining whether a specified portion of the hash exists in the payload portion of any job summaries in the in-memory list of job summaries. Responsive to determining at least one job summary includes the specified portion in the payload portion, responding to the query may include determining whether the query is an exact query, responsive to determining the query is not an exact query, generating a search result based on the in-memory job summaries having a payload portion that includes the specified portion of the hash, and responsive to determining that the query is an exact query, sending a verification request to job processors associated with the job summaries having a payload portion that includes the specified portion of the hash. As another example, job digests for a particular job processor may be included in a processor summary, which includes a list of job digests for the particular job processor and a list of property summaries for the particular job processor. As another example, sending a message to the job processor requesting a new job property in the payload portion can include determining, based on the updated job property statistics, that a first job property not currently represented in the payload portion is included in a minimum number of queries.

According to one general aspect, a computer-implemented method can include receiving, from a requesting process, a query having a conditional parameter corresponding to a job property, applying a transformation to a value of the conditional parameter, identifying, from an in-memory storage area storing a list of job summaries, each job summary being an entry in a probabilistic payload data structure, at least one job summary with a property value that matches the transformed value, and generating a response to the query based on the at least one job summary. When the query is an exact query, generating the response may include sending a verification request to a job processor associated with the at least one job summary.

According to one general aspect, a system includes a means for generating a processor summary on a periodic basis and sending the processor summary to a query system, wherein the processor summary includes a list of job digests each with a key portion and a payload portion. The system also includes a query system with a means for receiving a plurality of processor summaries, a means for storing job summaries generated from the job digests in an approximate membership data structure, and a means for responding to queries using the approximate membership data structure. The system may also include a means for tracking property statistics and a means for modifying the payload portion of a job summary based on the property statistics.

According to one general aspect, a system includes at least one processor and memory storing instructions that, when executed by the at least one processor, cause the system to perform any of the operations or methods disclosed herein.

What is claimed is:

1. A computer-implemented method comprising:
receiving, from a requesting process, a query having a result parameter and a conditional parameter, wherein the conditional parameter corresponds to a first job property;
hashing the conditional parameter to generate a hash;
selecting a portion of the hash;
identifying, from an in-memory storage area storing a list of job summaries, each job summary being an entry in a probabilistic payload data structure, at least one job summary with a property value that matches the portion of the hash;
generating a response to the query based on the at least one job summary, the response containing result information corresponding to a second job property based on the result parameter;
responsive to determining that usage of the in-memory storage area is low and that the portion of the hash is smaller than a maximum size, increasing the number of bits represented by the portion of the hash in a summary schema; and
responsive to determining that usage of the in-memory storage area is high and that the portion of the hash is larger than a minimum size, reducing the number of bits represented by the portion in a summary schema, wherein when the query is an exact query, generating the response includes sending a verification request to a job processor associated with the at least one job summary.

2. The method of claim 1, wherein the first job property is a key property and identifying the at least one job summary includes determining a location in the probabilistic payload data structure based on a hash of the conditional parameter; and
matching a portion of the hash to fingerprint portions of entries at the location.

3. The method of claim 1, wherein the conditional parameter is a first parameter and the query has a second parameter corresponding to a second job property, and the method further includes, for each job summary of the at least one job summary:
determining whether a payload portion of the job summary includes a value for the second job property; and
responsive to the payload portion including the value:
applying a transformation to the second parameter,
determining whether the payload portion has a value that matches the transformation,
responsive to determining that the payload portion of the job summary has a value that matches the transformation, sending the verification request, and
responsive to determining that the payload portion of the job summary lacks a second value that matches the transformation, excluding the job summary from the response to the query.

4. The method of claim 3, wherein determining whether the payload portion of the job summary includes a value for the second job property includes determining whether a summary schema includes the second job property for the job processor associated with the job summary.

5. The method of claim 1, further comprising:
updating job property statistics based on the query.

6. The method of claim 1, further comprising:
determining that a third job property is used in queries more frequently than the second job property; and
responsive to determining that the second job property is included in job digests for the job processor and that the third job property is not included in job digests for the job processor, sending a request to the job processor to replace the second job property with the third job property in job digests generated by the job processor.

7. The method of claim 1, further comprising:
determining that a third job property is used in queries more frequently than the second job property; and
responsive to determining that the second job property is included in job digests for a first job processor, determining that the third job property is not included in the job digests for the first job processor, and determining that usage of the in-memory storage area is low, sending a request to the first job processor to add the third job property to job digests generated by the first job processor.

8. The method of claim 1, further comprising:
determining that a third job property is used in queries more frequently than the second job property; and responsive to determining that the third job property and the second job property are included in job digests for the job processor and that memory usage for the in-memory storage area is high, sending a request to the job processor to delete the second job property from the job digest.

9. The method of claim 1, wherein a plurality of property summaries is stored, each property summary of the plurality of property summaries includes a property value and a number representing a quantity of jobs with that property value running on a particular job processor and the method further includes:
identifying property summaries with a property value that matches the portion of the hash; and
generating a response to the query based on the identified property summaries.

10. The method of claim 1, wherein generating the response to the query based on the at least one job summary includes generating the response from a payload portion of the at least one job summary responsive to:
determining that the query is an exact query;
determining that a single job summary is identified, the at least one job summary being the single job summary; and
determining that any remaining conditional parameters and result parameters are included in the payload portion.

11. A method comprising:
receiving, from each of a plurality of job processors, a processor summary, a processor summary for a job processor including a list of job digests, wherein each job digest in the list of job digests includes a job identifier for a job running on the job processor and a payload portion, the payload portion including at least one transformed job property value;
for each job digest, determining a location in a probabilistic payload data structure for the job digest and storing the payload portion and a fingerprint portion generated from a portion of a hash of the job identifier in an entry at the location as a job summary, wherein the probabilistic payload data structure is stored in an in-memory storage area;
responding to queries using the probabilistic payload data structure, wherein responding to a particular query includes:
identifying job properties corresponding to parameters of the particular query,
for each job property identified, updating job property statistics tracking the number of times the job property appears as a query parameter;
using the job property statistics to change the job properties represented in the payload portion for a job processor or to change the number of bits in the portion of the hash used to generate the fingerprint portion, and
responsive to determining that usage of the in-memory storage area is low and that the portion of the hash is smaller than a maximum size, increasing the number of bits represented by the portion of the hash in a summary schema; and
responsive to determining that usage of the in-memory storage area is high and that the portion of the hash is larger than a minimum size, reducing the number of bits represented by the portion in the summary schema.

12. The method of claim 11, wherein using the job property statistics to change the job properties in the payload portion includes:
determining that a first job property is used in queries at least a threshold number of times; and
sending a request to the plurality of job processors to include the first job property in the payload portion.

13. The method of claim 12, wherein the request to include the first job property is sent responsive to determining that usage of memory in the probabilistic payload data structure is low.

14. The method of claim 12, wherein the request to include the first job property is sent responsive to determining that a size of the payload portion is smaller than a maximum size.

15. The method of claim 12, wherein responding to the particular query includes, for each job property identified, updating statistics tracking resources used in accessing a value for the job property.

16. A query system comprising:
an in-memory storage area comprising a list of job summaries by a job processor, each entry in the list of job summaries including a partial hash of a job identifier for a job and a payload portion for the job, the payload portion changing based at least on one job property statistic;
a memory storing job property statistics, the job property statistics being updated based on received queries;
at least one processor; and
memory storing instructions that cause the query system to perform operations including:
periodically receiving job digests from a job processor of a plurality of job processors, wherein new job digests for the job processor update the list of job summaries,
receiving a query having a result parameter and a conditional parameter, the conditional parameter corresponding to a first job property, and responding to the query using the in-memory list of job summaries, the response containing result information corresponding to a second job property based on the result parameter,
updating the job property statistics with information obtained in responding to the query,
sending a message to the job processor requesting a new job property in the payload portion based on the updated job property statistics;
responsive to determining that usage of the in-memory storage area is low and that the partial hash is smaller than a maximum size, increasing the number of bits represented by the partial hash in a summary schema; and
responsive to determining that usage of the in-memory storage area is high and that the partial hash is larger than a minimum size, reducing the number of bits represented by the partial hash in a summary schema.

17. The query system of claim 16, wherein responding to the query using the in-memory list of job summaries includes:
identifying at least one job property in the query;
generating a hash of the job property;
determining whether a specified portion of the hash exists in the payload portion of any job summaries in the in-memory list of job summaries;
responsive to determining at least one job summary includes the specified portion in the payload portion:
determining whether the query is an exact query;
responsive to determining the query is not an exact query, generating a search result based on the in-memory job summaries having a payload portion that includes the specified portion of the hash;

responsive to determining that the query is an exact query, sending a verification request to job processors associated with the job summaries having a payload portion that includes the specified portion of the hash.

18. The query system of claim 16, wherein job digests for a particular job processor are included in a processor summary, which includes a list of job digests for the particular job processor and a list of property summaries for the particular job processor.

19. The query system of claim 16, wherein sending a message to the job processor requesting a new job property in the payload portion includes:

determining, based on the updated job property statistics, that a third job property not currently represented in the payload portion is included in a minimum number of queues.

\* \* \* \* \*